US008699192B2

(12) United States Patent
Wang et al.

(10) Patent No.: US 8,699,192 B2
(45) Date of Patent: Apr. 15, 2014

(54) METHOD, DEVICE AND SWITCH FOR PROVIDING SHORT-CIRCUIT PROTECTION FOR RESISTIVE AC LOAD

(75) Inventors: Xianfang Wang, Guangdong (CN); Yonglian Yang, Guangdong (CN); Baoning Deng, Guangdong (CN); Gang Zhou, Guangdong (CN); Jianwei Liu, Guangdong (CN); Xiaoyong Dong, Guangdong (CN); Linlin Pi, Guangdong (CN)

(73) Assignee: Shenzhen H & T Intelligent Control Co., Ltd., Shenzhen (CN)

( * ) Notice: Subject to any disclaimer, the term of this patent is extended or adjusted under 35 U.S.C. 154(b) by 150 days.

(21) Appl. No.: 13/254,542

(22) PCT Filed: Dec. 30, 2009

(86) PCT No.: PCT/CN2009/076302

§ 371 (c)(1), (2), (4) Date: Sep. 2, 2011

(87) PCT Pub. No.: WO2010/142129

PCT Pub. Date: Dec. 16, 2010

(65) Prior Publication Data

US 2012/0069480 A1 Mar. 22, 2012

(30) Foreign Application Priority Data

Jun. 9, 2009 (CN) .......................... 2009 1 0303100

(51) Int. Cl.
*H02H 3/08* (2006.01)

(52) U.S. Cl.
USPC ............................................................ 361/87

(58) Field of Classification Search
USPC ............................................................ 361/87
See application file for complete search history.

(56) References Cited

U.S. PATENT DOCUMENTS

| | | | | |
|---|---|---|---|---|
| 4,634,830 A * | 1/1987 | Furudate | .................... | 219/117.1 |
| 2002/0097008 A1* | 7/2002 | Krummel | ...................... | 315/291 |
| 2010/0161259 A1* | 6/2010 | Kim et al. | ....................... | 702/63 |

* cited by examiner

*Primary Examiner* — Jared Fureman
*Assistant Examiner* — Nicholas Ieva
(74) *Attorney, Agent, or Firm* — Jackson IPG PLLC

(57) ABSTRACT

The invention relates to a method for providing short-circuit protection for a resistive AC load, wherein the load is connected with an AC power supply through an active controlled switch controlled by a controller. The method for providing short-circuit protection for the resistive AC load comprises the following steps of: turning on the active controlled switch within a first conduction angle range; obtaining the mean current value of the load through a current detection circuit; and determining whether the mean current value of the load is greater than a default value or not, wherein, if so, the active controlled switch is controlled to be turned off, and if not, the active controlled switch is controlled to be turned on. The invention also relates to a device and a switch for providing short-circuit protection for the resistive AC load. The method, the device and the switch for providing short-circuit protection for the resistive AC load, which are provided by the invention, have the advantages that: when the switch is required to be turned on, the switch is turned on first within the first conduction angle range which cannot cause damage to the switch and the circuit and then whether the switch is continued to be turned on or not is determined by determining whether the resistive AC load is subjected to a short circuit or not through the obtained current value; therefore, the switch and the circuit which are connected with the load can be protected while the resistive AC load in a short-circuit condition can be detected.

2 Claims, 3 Drawing Sheets

METHOD, DEVICE AND SWITCH FOR PROVIDING SHORT-CIRCUIT PROTECTION FOR RESISTIVE AC LOAD

FIELD OF THE INVENTION

The invention relates to the field of protection of electrical power units, in particular to a method, a device and a switch for providing short-circuit protection for a resistive AC load.

BACKGROUND OF THE INVENTION

AC electrical power units or devices are provided with a plurality of resistive loads, such as incandescent lamps, thermal fuses, etc. In general, the resistive AC loads are connected with AC power supplies through mechanical switches or electronic switches. The switches are turned off at other times and only turned on when used to connect the resistive AC loads and the AC power supplies. During the use, filaments or thermal fuses of the resistive AC loads are susceptive to short circuits due to vibration or aging or other reasons. When the resistive AC loads are in the short-circuit condition, large current occurs when the power supplies are switched on and hence switches or controllers are easy to burn out so as to result in tripping and even safety incidents in severe cases. As currently available mechanical switches or electronic switches have no function of providing short-circuit detection and protection for the resistive AC loads, it is necessary to provide a method, a device and a switch for providing short-circuit protection for the resistive AC loads on the premise of guaranteeing the safety of the switches and circuits.

SUMMARY OF THE INVENTION

The technical problem to be solved of the invention is to provide a method, a device and a switch for providing short-circuit detection and protection for a resistive AC load, by overcoming the defect of no short-circuit detection and protection on the resistive AC load in the prior art.

In order to solve the technical problem, the invention adopts the technical proposal that: a method for providing short-circuit protection for a resistive AC load is provided, wherein the load is connected with an AC power supply through an active controlled switch controlled by a controller. The method comprises the following steps of:

A) turning on the active controlled switch within a first conduction angle range;

B) obtaining the mean current value of the load through a current detection circuit; and C) determining whether the mean current value of the load is greater than a default value or not, wherein, if so, the active controlled switch is controlled to be turned off, and is not, the active controlled switch is controlled to be turned on.

In the method for providing short-circuit protection for the resistive AC load, which is provided by the invention, the first conduction angle range comprises a conduction angle set which is positioned on the positive half cycle of an AC waveform and cannot cause damage to the switch when the resistive AC load is in a short-circuit condition, and includes starting conduction angle, ending conduction angle and intermediate values between the starting conduction angle and the ending conduction angle; the starting conduction angle is between 145 degrees and 168 degrees; and the ending conduction angle is all 180 degrees.

In the method for providing short-circuit protection for the resistive AC load, which is provided by the invention, the step A) further comprises the following steps of:

A1) determining whether the active controlled switch is required to be turned on or not, if so, executing the next step, otherwise repeating the step; and A2) turning on the active controlled switch within the first conduction angle range.

In the method for providing short-circuit protection for the resistive AC load, which is provided by the invention, the step B) further comprises the following steps of:

B1) obtaining analogue values of the load current within the first conduction angle range;

B2) converting the analogue values of the current into digital signals; and

B3) obtaining the mean value of the current digital signals.

The invention also discloses a device for providing short-circuit protection for a resistive AC load, comprising a controller for controlling the on/off state of an active controlled switch for controlling the connection or disconnection between the load and an AC power supply connected therewith, wherein an output port of the controller is connected with a control end of the active controlled switch to control the on/off state of the active controlled switch; also comprising a first conduction angle control module, a current detection circuit, a mean value acquisition module and a determination module, wherein the first conduction angle control module is used for controlling the active controlled switch to be turned on within the first conduction angle range; the current detection circuit is used for obtaining the current flowing through the load, converting the current into a form acceptable by the controller, and sending the current in the acceptable form to an input port of the controller; the mean value acquisition module is used for obtaining the mean current value outputted by the current detection circuit; and the determination module is used for determining whether the mean current value is greater than a default value or not.

In the device provided by the invention, the first conduction angle range is positioned on the positive half cycle of an AC waveform and includes starting conduction angle, ending conduction angle and intermediate values between the starting conduction angle and the ending conduction angle; the starting conduction angle is between 145 degrees and 168 degrees; and the ending conduction angle is all 180 degrees.

In the device provided by the invention, the controller comprises an MCU (Micro Control Unit); the active controlled switch comprises a thyristor; and the controller obtains current values of the load through an analog-to-digital conversion input port on the controller.

In the device provided by the invention, the current detection circuit comprises a resistance R1, a resistance R2, a resistance R3 and a capacitance C1, in which one end of the active controlled switch is connected to a zero line of the AC power supply through the resistance R1, and the other end of the active controlled switch is electrically connected with a phase line of the AC power supply through the load; the resistance R2 and the resistance R3 are connected in series between a power supply source of the controller and a ground thereof; an intermediate connection point is respectively connected with one end of the capacitance C1 and the analog-to-digital conversion input end of the controller; and the other end of the capacitance C1 is connected to one end of the active controlled switch, which is connected with the resistance R1.

In the device provided by the invention, the mean value acquisition module comprises an analog-to-digital conversion unit for converting analogue values of the current into digital signals, and a digital signal mean value acquisition unit for obtaining the mean value of the signals outputted by the analog-to-digital conversion unit.

The invention also relates to a switch for controlling the connection or disconnection between a load applying an AC power supply and an AC network, comprising a controller for controlling the on/off state of an active controlled switch for controlling the connection or disconnection between the load and the power supply connected therewith, wherein an output port of the controller is connected with a control end of the active controlled switch to control the on/off state of the active controlled switch; also comprising a first conduction angle control module, a current detection circuit, a mean value acquisition module and a determination module, wherein the first conduction angle control module is used for controlling the active controlled switch to be turned on within the first conduction angle range; the current detection circuit is used for obtaining the current flowing through the load, converting the current into a form acceptable by the controller, and sending the current in the acceptable form to an input port of the controller; the mean value acquisition module is used for obtaining the mean current value outputted by the current detection circuit; and the determination module is used for determining whether the mean current value is greater than a default value or not.

The method, the device and the switch for providing short-circuit protection for the resistive AC load, which are provided by the invention, have the advantages that: when the switch is required to be turned on, the switch is turned on first within the first conduction angle range which cannot cause damage to the switch and the circuit and then whether the switch is continued to be turned on or not is determined by determining whether the resistive AC load is subjected to a short circuit or not through the obtained current value; therefore, the switch and the circuit which are connected with the load can be protected while the resistive AC load in a short-circuit condition can be detected.

DETAILED DESCRIPTION OF THE PREFERRED EMBODIMENTS

Further description is given to the embodiment of the invention with the accompanying drawings.

Figure 1:
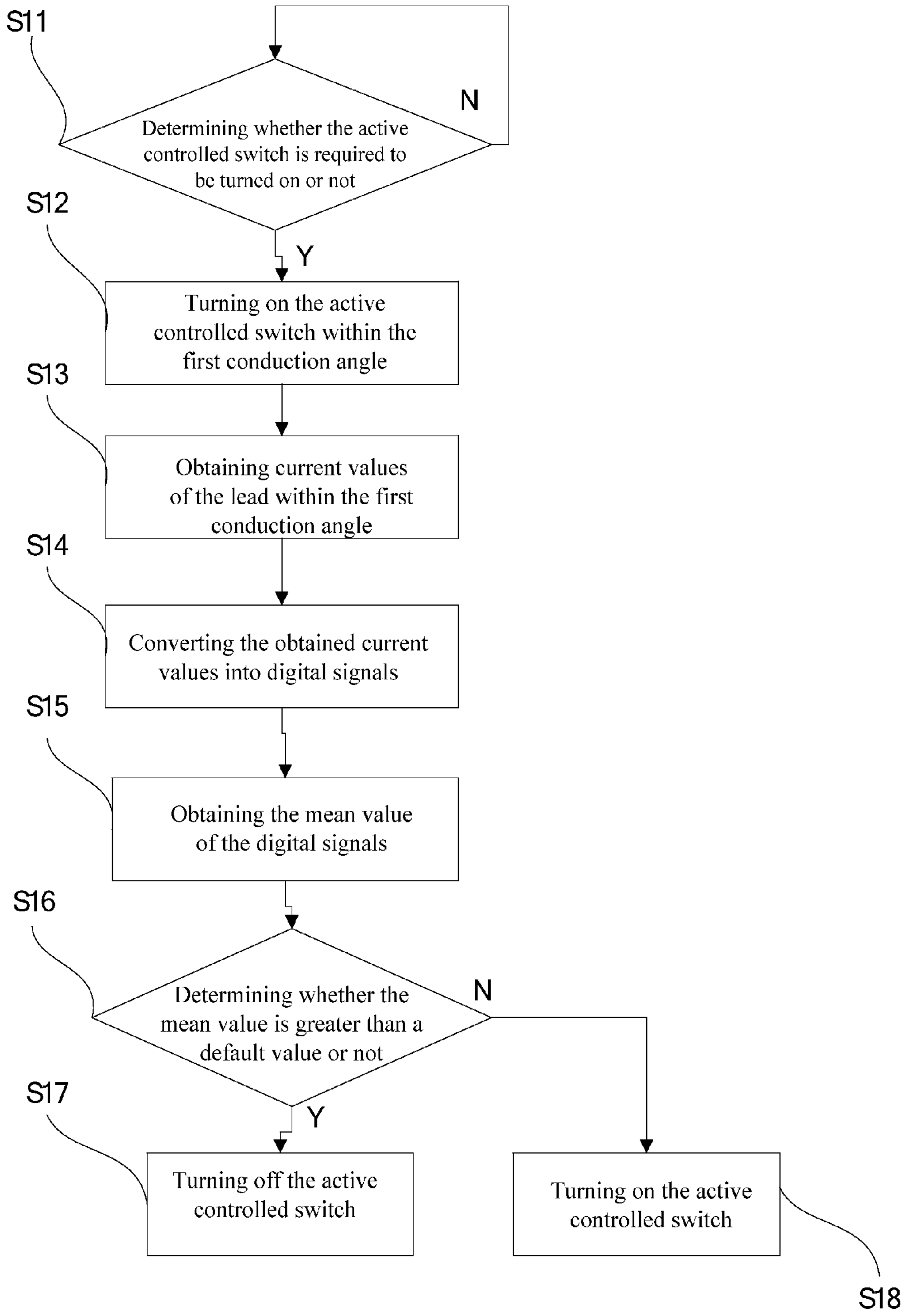
FIG. 1 is a flow chart of a method in an embodiment of the method, a device and a switch for providing short-circuit protection for a resistive AC load.

As illustrated in FIG. 1, in the embodiment of a method, a device and a switch for providing short-circuit protection for a resistive AC load, the method comprises the following steps of:

S11: determining whether the active controlled switch is required to be turned on or not, if so, executing the step S12, otherwise repeating the step. As is now well known, the resistive AC load is not required at all times to be connected with an AC power supply, and a switch has the functions of connecting the resistive AC load and the AC power supply when the connection is needed and disconnecting the resistive AC load and the AC power supply when the connection is not needed. In the event of the resistive AC load in a short-circuit condition, no damage can be caused to the switch and a circuit connected therewith as long as the switch is not turned off and a short-circuit point is not actually connected to the AC power supply. In general, when the resistive AC load is required to be connected with the AC power supply, a user needs to press or move a button or a key on the switch, and then an obvious signal is given. Therefore, in the step, whether the switch is required to be turned off or not is determined by detecting the signal, if so, executing the next step, otherwise repeating the step after waiting for a period of time.

Figure 2:
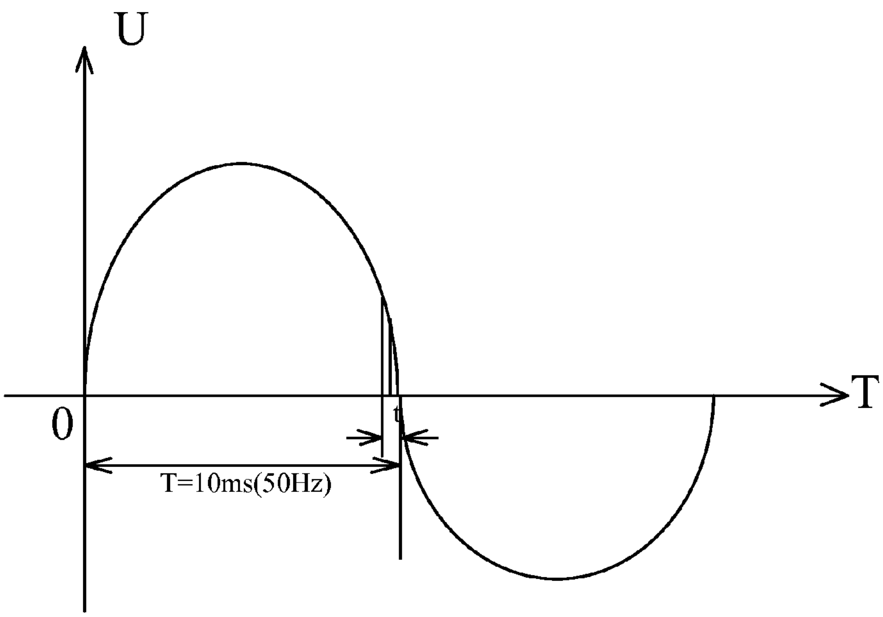
FIG. 2 is a schematic diagram of the position of a first conduction angle range in the embodiment in an AC waveform.

S12: turning on the active controlled switch within the first conduction angle range. In the step, as it is determined that the switch is required to be turned on in the step S11 and it is not known whether the resistive AC load is subjected to the short circuit or not at the time, the process for turning on the active controlled switch for providing an AC path within the first conduction angle range has the advantages of not only obtaining the load current to determine whether the resistive AC load connected with the switch is subjected to the short circuit or not but also ensuring that no damage can be caused to the switch and the circuit due to the short circuit even in the event of the load in a short-circuit condition, wherein the first conduction angle range is set and stored in advance, and the condition for determining the first conduction angle range is to enable the active controlled switch to be turned on for a short time under the condition of low voltage of the AC power supply. FIG. 2 illustrates the position of the first conduction angle range in an AC waveform. As illustrated in FIG. 2, the first conduction angle range is positioned on the positive half cycle of the AC waveform, and includes starting conduction angle, ending conduction angle and intermediate values between the starting conduction angle and the ending conduction angle. In general, the starting conduction angle is between 145 degrees and 168 degrees, and the ending conduction angle is all 180 degrees. That is to say, the first conduction angle range can be from 145 to 180 degrees and can also be from 168 to 180 degrees. Although different value ranges correspond to different conduction time (the duration corresponding to the value range from 145 to 180 degrees is approximately 2 ms while the duration corresponding to the value range from 168 to 180 degrees is 660 ms), end points of the first conduction angle range are all at 180 degrees. That is to say, regardless of the settings, the end points of the first conduction angle range are all the zero crossing point (ZCP) for connecting the positive half cycle and the negative half cycle of the AC waveform. The only difference is the duration before the point is reached. In the embodiment, the first conduction angle range is from 160 to 180 degrees, and the duration of the first conduction angle range is 1.1 ms. As illustrated in FIG. 2, the first conduction angle range is small, and the conduction time of the active controlled switch is t. The t value is different under different voltages and frequencies of the AC power supply. Herein, whether the resistive AC load is subjected to the short circuit or not can be detected by checking a current feedback waveform. As the conduction angle is small and the duration is short, the output energy is not so sufficient as to cause damage to the active controlled switch and lines, and thus devices cannot be damaged even when the circuit is in a short-circuit condition.

S13: obtaining the current value of the load within the first conduction angle range. In the step, values of the current flowing through the resistive AC load when the active controlled switch is turned on within the first conduction angle range are obtained. In the embodiment, the values are analogue signals. As is known from the step S12 that the active controlled switch is only turned on for a period of time under the low voltage of the AC power supply, the load has current only within the period of time t. In the step, therefore, the current of the resistive AC load is only continuously read within the period of time.

S14: converting the obtained current values into digital signals, that is, converting the analogue signal values obtained in the step S13 into digital signal values. In general, it is only required to perform analog-to-digital conversion (AD conversion) on the obtained analogue values of the current in the step. As for the embodiment, continuous waveforms obtained within the period of time when the active controlled switch is turned on are subjected to AD conversion in succession, and digital signals representing the current amplitude are obtained. For example, different duty ratios can be used to represent different current values.

Figure 3:
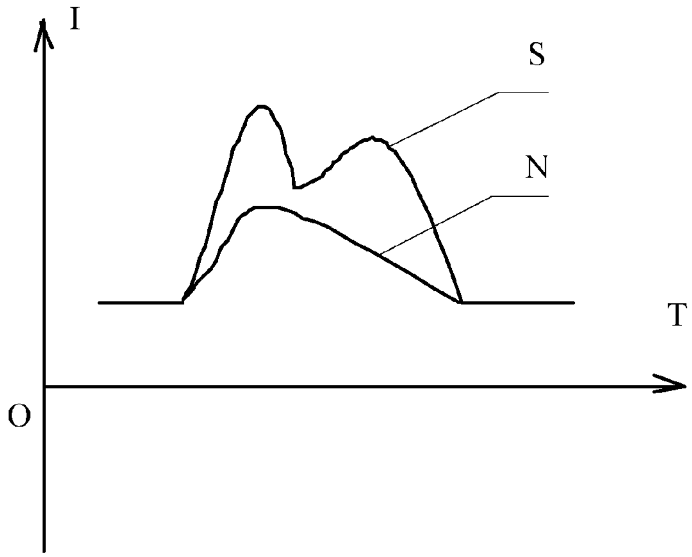
FIG. 3 is a schematic diagram of the load current in the embodiment when the resistive AC load is in a short-circuit condition and in a normal condition.

S15: obtaining the mean value of the converted digital signals. The conduction only lasts for a short time. Although the conduction time is short, the conduction does not mean only a point but lasts for a period of time, so the current of the digital signals can be represented by the mean value of the digital signals. FIG. 3 illustrates a waveform of the current flowing through the resistive AC load when the resistive AC load is in the short-circuit condition, and a waveform of the current flowing through the resistive AC load when the resistive AC load is not in the short-circuit condition, wherein a line S represents the waveform of the load current when the resistive AC load is in the short-circuit condition and the active controlled switch is turned on, and a line N represents the waveform of the load current when the resistive AC load is in a normal condition and the active controlled switch is turned on. The difference of the current waveforms when the resistive AC load is in the short-circuit condition and the normal condition is shown in FIG. 3, that is, the current values when the resistive AC load is in the short-circuit condition are far greater than the current values when the resistive AC load is in the normal condition. Therefore, the mean current value also has great difference.

S16: determining whether the mean value is greater than a default value or not. If so, it shows that the resistive AC load is in the short-circuit condition and the active controlled switch cannot be turned on, and then the step S17 is executed. If not, it shows that the resistive AC load is in the normal condition and then the active controlled switch can be normally turned on to connect the resistive AC load to the AC power supply according to the requirements of the user. The step S15 and the FIG. 3 have clearly illustrated the difference of the current waveforms when the resistive AC load is in the short-circuit condition and in the normal condition. In the step, it is only required to select a value between the mean current value when the resistive AC load is in the short-circuit condition and the mean current value when the resistive AC load is in the normal condition, as the default value of the resistive AC load, and then the short-circuit condition and the normal condition of the resistive AC load can be separated from each other. Consequently, correct judgment can be made. Moreover, it is particularly worth mentioning that the default value is preset based on the situation in which the switch is used. For example, the power of the resistive AC load, etc. The values of the current flowing through resistive AC loads with different powers are different when the resistive AC loads are in the normal condition while the values of the current flowing through the resistive AC loads with different powers are almost the same when the resistive AC loads are in the short-circuit condition. Therefore, the higher the power of a resistive AC load, the smaller the difference value between the mean value of the current flowing through the resistive AC load when the resistive AC load is in the normal condition and the mean value of the current flowing through the resistive AC load when the resistive AC load is in the short-circuit condition, and thus the value range of the default value is smaller and the accuracy of AD conversion and determination is higher.

S17: turning off the active controlled switch. In the step, as the AC power supply is determined to be in a short-circuit condition, the active controlled switch does not respond to the requirement of the user on turning on the active controlled switch again and then is not turned on again.

S18: turning on the active controlled switch. In the step, as the AC power supply is determined to be in a normal condition, the active controlled switch responds to the requirement of the user on turning on the active controlled switch and is then turned on to connect the resistive AC load to the AC power supply.

Figure 4:
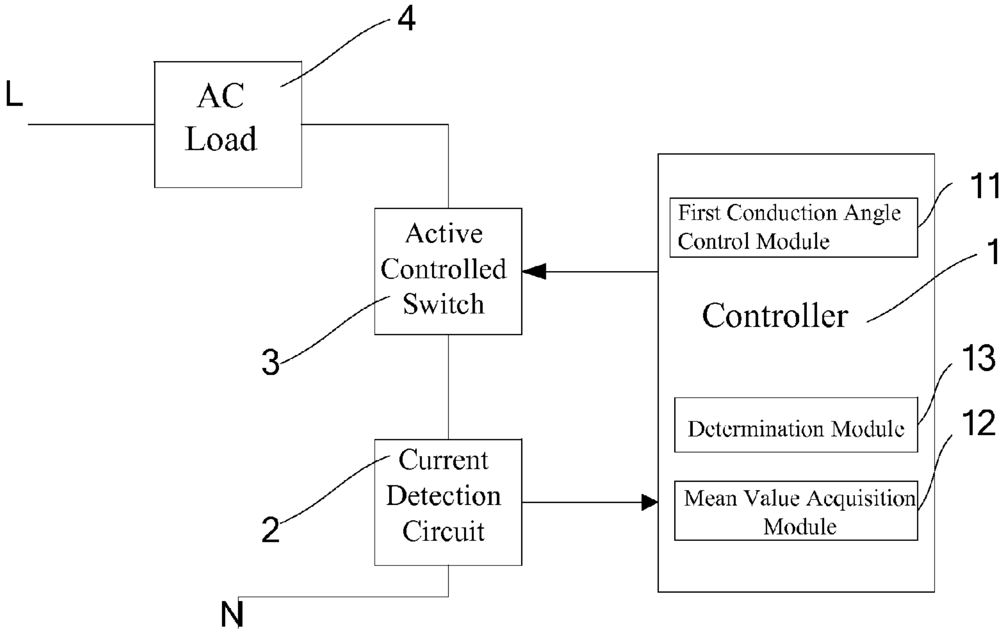
FIG. 4 is a structure diagram of the device in the embodiment.

FIG. 4 is a structure diagram of a device for providing short-circuit protection for a resistive AC load in the embodiment. In the embodiment, the device comprises a controller 1, an active controlled switch 3 and a current detection circuit 2. FIG. 4 also illustrates a resistive AC load 4, but the resistive AC load 4 is not a part of the device and only shown in FIG. 4 for the convenience of description. In the embodiment, a phase line of an AC power supply is connected to one end of the resistive AC load 4 of which the other end is connected to one switching end of the active controlled switch 3; the other switching end of the active controlled switch 3 is connected to one end of the current detection circuit 2 of which the other end is connected to a zero line of the AC power supply; a control end of the active controlled switch 3 is connected to a specified output end of the controller 1; and an output end of the current detection circuit 2 is connected to an input end of the controller 1. In the embodiment, the controller 1 is an MCU (Micro Control Unit); the active controlled switch 3 is a thyristor; and the input end of the controller 1, which is connected with the output end of the current detection circuit 2, is an input port of an analog-to-digital conversion function module for the MCU. In addition, the controller 1 is used for controlling the on/off state of the active controlled switch 3 for controlling the connection or disconnection between the resistive AC load 4 and the AC power supply connected therewith, and an output port of the controller 1 is connected with a control end of the active controlled switch 3 to control the on/off state of the active controlled switch 3. Moreover, the active controlled switch 3 is controlled to be turned on within a first conduction angle range by a first conduction angle control module 11; the current detection circuit 2 obtains the current flowing through the resistive AC load, converts the current into a form acceptable by the controller 1, and sends the current in the acceptable form to an input port of the controller 1; a mean value acquisition module 12 obtains the mean current value outputted by the current detection circuit; and a determination module 13 determines whether the mean current value is greater than a default value or not. In the embodiment, the active controlled switch 3 is controlled to be turned on within a range from 160 to 180 degrees by the first conduction angle control module 11, and the conduction duration is 1.1 ms, wherein the conduction angle range is preset in the first conduction angle control module 11. Of course, in other embodiments, the active controlled switch 3 can also be controlled to be turned on by the first conduction angle control module 11, by taking any angle between 144 degrees and 168 degrees as the starting conduction angle and 180 degrees as the ending conduction angle, wherein the conduction angle range is also preset in the first conduction angle control module 11. Furthermore, in the embodiment, the mean value acquisition module 12 comprises an analog-to-digital conversion unit for converting analogue values of the current into digital signals and a digital signal mean value acquisition unit for obtaining the mean value of the current digital signals outputted by the analog-to-digital conversion unit, wherein the analog-to-digital conversion unit is arranged on the input port of the MCU and only required to be enabled when used. Of course, in the other embodiments, the analog-to-digital conversion unit can also be externally connected.

Figure 5:
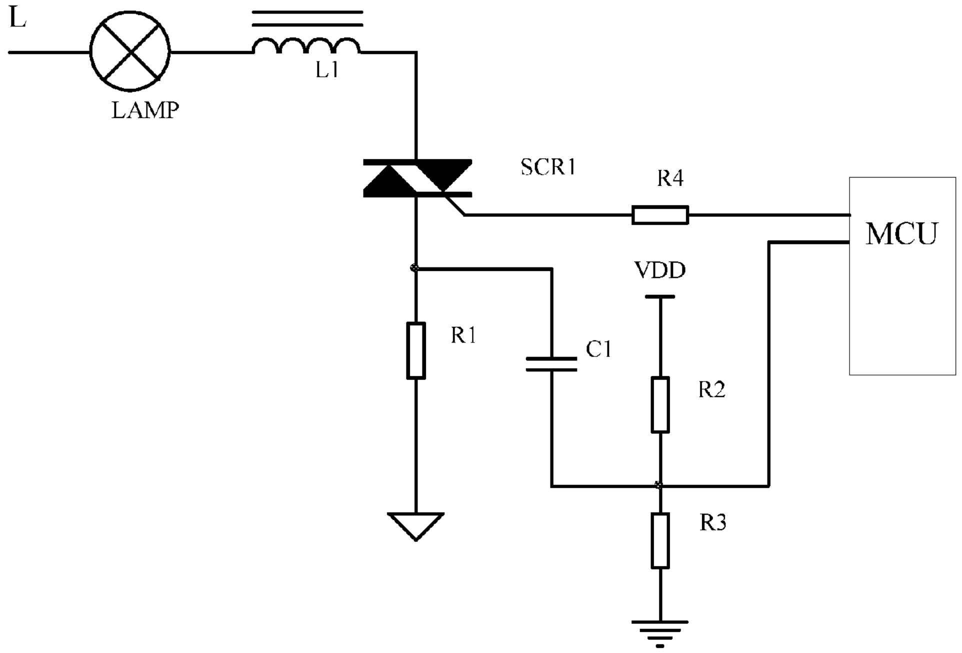
FIG. 5 is a circuit diagram of a current detection circuit for the device in the embodiment.

FIG. 5 is a circuit diagram of the current detection circuit 2 in the embodiment. In FIG. 4, the current detection circuit 2 comprises a thyristor SCR1, a resistance R1, a resistance R2, a resistance R3 and a capacitance C1, wherein one end of the thyristor SCR1 is connected to the zero line of the AC power supply through the resistance R1, and the other end of the thyristor SCR1 is electrically connected with the phase line of the AC power supply through a load LAMP; the resistance R2 and the resistance R3 are connected in series between a power supply source of the controller MCU and a ground thereof; an intermediate connection point between the resistance R2 and the resistance R3 is respectively connected with one end of the capacitance C1 and an analog-to-digital conversion input end of the controller MCU; and the other end of the capacitance C1 is connected to one end of the thyristor SCR1, which is connected with the resistance R1. Moreover, FIG. 5 also illustrates an inductance L1 and a resistance R4, wherein the inductance L1 is connected in series between the thyristor SCR1 and the load LAMP and used for EMI (Electromagnetic Interference) suppression; and the resistance R4 is connected in series to a control end of the thyristor SCR1 and taken as a current-limiting resistance.

The invention also relates to a switch for providing short-circuit protection for a resistive AC load, in particular to a switch for controlling the connection or disconnection between the load applying an AC power supply and an AC network. The switch comprises a controller 1 for controlling the on/off state of an active controlled switch 3 for controlling the connection or disconnection between the resistive AC load 4 and the power supply connected therewith, wherein an output port of the controller 1 is connected with a control end of the active controlled switch 3 to control the on/off state of the active controlled switch 3. The switch also comprises a first conduction angle control module 11, a current detection circuit 2, a mean value acquisition module 12 and a determination module 13, wherein the first conduction angle control module 11 is used for controlling the active controlled switch 3 to be turned on within a first conduction angle range; the current detection circuit 2 is used for obtaining the current flowing through the resistive AC load 4, converting the current into a form acceptable by the controller 1, and sending the current in the acceptable form to an input port of the controller 1; the mean value acquisition module 12 is used for obtaining the mean current value outputted by the current detection circuit 2; and the determination module 13 is used for determining whether the mean current value is greater than a default value or not. In the embodiment, the switch is formed by the above various independent components. In the other embodiments, the above various components (See FIG. 4; with the resistive AC load 4 excluded) are arranged to form a module or an integrated circuit to be used on the switch.

The embodiment only gives detailed description of the preferred embodiments of the invention. Although the description of the preferred embodiments is specific and detailed, the scope of the invention patent shall not be interpreted to be limited to the preferred embodiments. It shall be noted that a plurality of changes and modifications can be made without being deviated from the concept of the invention and all belong to the scope of protection of the invention. Therefore, the scope of protection of the invention patent shall be based on the attached claims.

What is claimed is:

1. A device for providing short-circuit protection for a resistive AC load, comprising a controller for controlling the on/off state of an active controlled switch for controlling the connection or disconnection between the load and an AC power supply connected therewith, wherein an output port of the controller connected with a control end of the active controlled switch to control the on/off state of the active controlled switch;

wherein the controller comprises an MCU (Micro Control Unit); the active controlled switch comprises a thyristor; and the controller obtains current values of the load through an analog-to-digital conversion input port on the controller;

also comprising a first conduction angle control module, a current detection circuit, a mean value acquisition module and a determination module, wherein the first conduction angle control module used for controlling the active controlled switch to be turned on within the first conduction angle range;

wherein a first conduction angle range is positioned on a positive half cycle of an AC waveform and includes starting a conduction angle, an ending conduction angle and an intermediate values between the starting conduction angle and the ending conduction angle;

the starting conduction angle is between 145 degrees and 168 degrees; and the ending conduction angle is all 180 degrees;

the current detection circuit used for obtaining the current flowing through the load, converting the current into a form acceptable by the controller, and sending the current in the acceptable form to an input port of the controller;

wherein the current detection circuit comprises a resistance R1, a resistance R2, a resistance R3 and a capacitance C1, in which one end of the active controlled switch is connected to a zero line of the AC power supply through the resistance R1, and the other end of the active controlled switch is electrically connected with a phase line of the AC power supply through the load;

the resistance R2 and the resistance R3 are connected in series between a power supply source of the controller and a ground thereof;

an intermediate connection point of the resistance R2 and the resistance R3 is respectively connected with one end of the capacitance C1 and the analog-to-digital conversion input port of the controller; and the other end of the capacitance C1 is connected to one end of the active controlled switch, which is connected with the resistance R1;

the mean value acquisition module used for obtaining the mean current value outputted by the current detection circuit; and the determination module used for determining whether the mean current value greater than a default value or not.

2. The device according to claim 1, wherein the mean value acquisition module comprises an analog-to-digital conversion unit for converting analogue values of the current into digital signals, and a digital signal mean value acquisition unit for obtaining the mean value of the signals outputted by the analog-to-digital conversion unit.

* * * * *